US012779723B2

(12) United States Patent
Fischer et al.

(10) Patent No.: US 12,779,723 B2
(45) Date of Patent: Nov. 3, 2026

(54) PLASTIC STRAND GRANULATOR HAVING AN ADJUSTING MECHANISM FOR ADJUSTING THE CUTTING GAP

(71) Applicant: Maag Germany GmbH, Grossostheim (DE)

(72) Inventors: Florian W. Fischer, Bamberg (DE); Stefan Dahlheimer, Grossostheim (DE)

(73) Assignee: Maag Germany GmbH, Grossostheim (DE)

( * ) Notice: Subject to any disclaimer, the term of this patent is extended or adjusted under 35 U.S.C. 154(b) by 619 days.

(21) Appl. No.: 17/769,236

(22) PCT Filed: Oct. 9, 2020

(86) PCT No.: PCT/EP2020/078482
§ 371 (c)(1),
(2) Date: Apr. 14, 2022

(87) PCT Pub. No.: WO2021/074040
PCT Pub. Date: Apr. 22, 2021

(65) Prior Publication Data

US 2024/0123645 A1 Apr. 18, 2024

(30) Foreign Application Priority Data

Oct. 15, 2019 (DE) ..................... 10 2019 127 762.0

(51) Int. Cl.
*B26D 7/00* (2006.01)
*B26D 1/00* (2006.01)
(Continued)

(52) U.S. Cl.
CPC ............. *B26D 7/0006* (2013.01); *B26D 1/03* (2013.01); *B26D 1/58* (2013.01); *B26D 5/02* (2013.01);
(Continued)

(58) Field of Classification Search
CPC .......... B26D 7/0006; B26D 1/03; B26D 5/02; B26D 7/086; B26D 1/58;
(Continued)

(56) References Cited

U.S. PATENT DOCUMENTS 2,782,853 A * 2/1957 Heffelfinger ........... B26D 1/385
83/350
3,685,751 A 8/1972 Anders
(Continued)

FOREIGN PATENT DOCUMENTS

CN 207327114 U 5/2018
DE 19 64 413 A1 7/1971
(Continued)

OTHER PUBLICATIONS

DE_102008033425_A1 (Year: 2010).*
(Continued)

*Primary Examiner* — Jonathan G Riley
(74) *Attorney, Agent, or Firm* — KDW FIRM PLLC

(57) ABSTRACT

In a plastic strand granulator the width of a cutting gap between a cutting rotor and a knife strip is gauged by an adjustment mechanism by setting the position of the knife strip. For this purpose the adjustment mechanism has an actuator with a differential thread having a reducing transmission ratio. The adjustment mechanism can advantageously be gauged automatically to a predetermined cutting gap width by a control circuit, wherein the adjustment mechanism is gauged in dependence on vibration parameters which are captured on the knife strip or on the cutting rotor. For this purpose, ultrasonic vibrations are introduced into the component in question and detected at some distance therefrom and evaluated.

23 Claims, 5 Drawing Sheets

(51) Int. Cl.

| | |
|---|---|
| ***B26D 1/03*** | (2006.01) |
| ***B26D 1/58*** | (2006.01) |
| ***B26D 5/02*** | (2006.01) |
| ***B26D 7/08*** | (2006.01) |
| ***B26D 7/26*** | (2006.01) |
| ***B29B 9/02*** | (2006.01) |

(52) U.S. Cl.
CPC ................ *B26D 7/086* (2013.01); *B29B 9/02* (2013.01); *B26D 2001/0046* (2013.01); *B26D 2007/2671* (2013.01)

(58) Field of Classification Search
CPC .......... B26D 2007/2671; B26D 7/2628; B26D 7/26; B26D 2001/0046; B29B 9/02; B29B 9/06
See application file for complete search history.

(56) References Cited

U.S. PATENT DOCUMENTS

| | | | | | |
|---|---|---|---|---|---|
| 4,417,843 | A * | 11/1983 | Bonga | G05B 19/408 | |
| | | | | 414/676 | |
| 5,330,340 | A | 7/1994 | Suppon et al. | | |
| 7,421,918 | B2 * | 9/2008 | Cable | G05G 1/54 | |
| | | | | 74/504 | |
| 2008/0175682 | A1 * | 7/2008 | Musil | B23B 29/0341 | |
| | | | | 408/180 | |
| 2010/0109177 | A1 | 5/2010 | Garbe | | |

FOREIGN PATENT DOCUMENTS

| | | | | |
|---|---|---|---|---|
| DE | 1964413 A * | 7/1971 | B29B 9/065 |
| DE | 36 20 015 A1 | 11/1986 | |
| DE | 199 33497 A1 | 1/2001 | |
| DE | 10 2007 016347 A1 | 10/2008 | |
| DE | 202007013127 U1 * | 4/2009 | B02C 18/14 |
| DE | 102008033425 A1 * | 1/2010 | B02C 18/148 |
| EP | 0452376 B1 | 6/1993 | |
| EP | 2296857 B1 | 11/2011 | |
| EP | 2 853 877 A2 | 4/2015 | |
| GB | 1300110 A | 12/1972 | |
| GB | 2202299 A * | 9/1988 | F16H 25/20 |
| WO | WO 01/94088 A2 | 12/2001 | |
| WO | WO 02/100621 A2 | 12/2002 | |
| WO | 2010006572 A1 | 1/2010 | |

OTHER PUBLICATIONS

DE_102008033425_A (Year: 2010).*
DE_1964413_A (Year: 1969).*
DE_202007013127_U1 (Year: 2009).*
GB_2202299_A_ (Year: 1988).*
International Search Report and Written Opinion for Application No. PCT/EP2020/078482 dated Jan. 12, 2021.
Intelligent Pelletizing Solutions, "Strand Pelletizing with Innovation," Advertisment in Journal K-Zeitung Kunststoff und Kautschuk, 1 page (Sep. 23, 2011).
Intelligent Pelletizing Solutions, "Automatic Cutting Gap Adjustment Typ ips-ACGA," [Advertisment Flyer], 2 pages (Jul. 2015).
Wikipedia, "Differential Thread," de.wikipedia.org, [online], May 31, 2022, <URL: https://de.wikipedia.org/wiki/Differenzgewinde >.
Indian Office Action in IN Application No. 202217023084 dated Jun. 5, 2026, 15 pages.

* cited by examiner

PLASTIC STRAND GRANULATOR HAVING AN ADJUSTING MECHANISM FOR ADJUSTING THE CUTTING GAP

CROSS-REFERENCE TO RELATED APPLICATIONS

This application is a continuation of and claims priority to Patent Application No. PCT/EP2020/078482 filed Oct. 9, 2020, which claimed priority to German Patent Application No. 10 2019 127 762.0 filed Oct. 15, 2019, the entire disclosures of which are incorporated by reference herein.

TECHNICAL FIELD

The invention relates to a plastic strand granulator for pelletizing plastic strands and in this context in particular an adjustment mechanism for adjusting the width of a cutting gap between a cutting rotor and a knife strip arranged at a small distance therefrom.

BACKGROUND

Plastic strand granulators are employed in plastic strand granulating installations, in which molten plastic strands are extruded from nozzles and fed to a water bath, in which they cool down and acquire the necessary strength in order to subsequently be pelletized into granules in the plastic strand granulator. The water bath can be formed as a trough or, as in EP 0452 376 B1, as a guiding device in the form of a—frequently inclined—water-flushed channel. There are many different variants in which the plastic strands are cooled and brought to the desired granulation temperature from the point at which they exit the extruder nozzle to the point at which they enter the granulator. The granulator has a housing with a feed opening for feeding the plastic strands to be granulated and an outlet opening for removing the plastic granules. Inside the housing there is located a cylindrical cutting rotor as a rotating knife arrangement with cutting knives evenly distributed over the circumference and a fixed knife strip running parallel to the rotational axis of the cutting rotor, on which the plastic strands are granulated into granules by means of the cutting rotor. Due to the force of gravity, the granules fall out of the granulator housing through the outlet opening at the bottom.

SUMMARY

There is a cutting gap between the cutting rotor and the knife strip, which in order to achieve a desired granulate quality must be set as precisely as possible and the width of which must be readjusted, in particular during operation. It is known, for example, from U.S. Pat. No. 2,782,853 to mount the knife strip on a pivotable knife holder and to set the cutting gap width via the pivoting position of the knife holder. A control circuit is used in which a button acting on a surface of the rotating cutting rotor records a temperature-related change in the cutting rotor diameter, for example, and sends a corresponding signal to a controller, by means of which the pivoting position of the knife holder is changed in such a manner that the distance between the cutting rotor and the knife strip is restored by turning a gauging screw forwards or backwards accordingly. The gauging screw acts on one end of the knife holder, which is disposed opposite to the knife strip with reference to the pivot axis of the knife holder. Overall, two mutually spaced-apart set screws act on the knife holder in the manner described, so that the parallelism between the knife strip and the rotational axis of the cutting rotor can also be set by turning one or the other set screw forwards or backwards accordingly.

The following publications can be cited as background information as general prior art. DE 199 33 497 A1 discloses an apparatus for setting the cutting gap between a cutting knife and a counter-knife body.

DE 19 64 413 A discloses a device for granulating thermoplastic plastics with a cutter head which granulates the measuring strands exiting from a nozzle plate.

DE 10 2008 033 425 A1 discloses a strand granulator for cutting up strand-shaped material, which consists of an infeed mechanism for feeding the material to be cut up and a rotatable cutting rotor with cutting teeth arranged thereon and a cutting strip.

The object of the present invention is to optimize the adjustment mechanism for setting the cutting gap width.

According to a first aspect, the adjustment mechanism comprises at least one actuator with differential thread to adjust the position of the knife strip accordingly. A differential thread usually has a reducing transmission ratio.

A differential thread is characterized by two intertwined threads with different pitches. Differential threads are known from differential thread screws, which consist of three coaxial parts, of which the inner part has a first-pitch external thread, the outer part has a second-pitch external thread, and the central part has a first-pitch internal thread and a second-pitch external thread. With a suitable formation, the inner part can be displaced axially relative to the outer part (or alternatively the outer part relative to the inner part) by turning the middle part, without the axially displaced part rotating in the process. The axial displacement of the aforesaid central part within the aforesaid outer (or inner) part by turning the central part by a relatively large angle of rotation only leads to a small axial displacement of the aforesaid inner (or outer) part, wherein the transmission ratio is all the lower, the smaller the difference between the two slopes is. By means of the differential thread with reducing transmission ratio therefore an even better fine gauging can be achieved than with, for example, conventional fine-thread screws. On the contrary, normal threads with correspondingly higher strength can be employed in the differential thread. In particular, due to the transmission ratio, in addition only small driving forces are required, so that even manual driving without tools is possible.

The differential thread can have a transmission ratio between 1:2 and 1:20, preferably about 1:5, which corresponds to a ratio between the first and the second pitch of 1:1.2.

Advantageously, the adjustment mechanism can have a pivot axis around which the knife strip is pivotably mounted, wherein a pivoting position of the knife strip can be set by means of the actuator, as is fundamentally the case in U.S. Pat. No. 2,782,853 mentioned at the outset. For example, the knife strip can be mounted accordingly on a pivotably mounted knife holder. Insofar as the knife strip on the one hand and a point of action of the actuator on the knife holder holding the knife strip on the other hand are arranged at different distances from the pivot axis, an additional leverage effect must be taken into account with reference to the displacement of the knife strip relative to the axial adjustment of the actuator. Advantageously, the actuator acts on the pivotable knife holder at a suitable point between the pivot axis and the knife strip, specifically as close as possible to the knife strip. If the point of action of the actuator is in the middle between the knife strip and the pivot axis (and the actuator acts on the knife holder in a direction roughly tangential to the pivot axis), the transmission ratio deteriorates by a factor of 2. Of course, it is most expedient if the actuator point of action is even further spaced apart from the pivot axis than the knife strip, wherein this can be difficult to implement for reasons of space.

The actuator can preferably be actuated from outside of the housing in which the cutting rotor is arranged. In particular, due to the particular reducing transmission ratio, as mentioned, the actuator is easy to actuate manually.

The gauging accuracy of the adjustment mechanism can be ensured by executing the differential thread of the actuator in play-free manner, in particular by means of a spring bias, e.g. by means of plate springs.

Similar to the aforementioned U.S. Pat. No. 2,782,853, the adjustment mechanism can have two such actuators with differential threads, which are arranged parallel to one another at the largest mutual distance next to one another. In order to save space, the actuators can be arranged within the granulator housing outer walls such that they move forwards and backwards therein parallel to the outer sides of the walls.

Alternatively, the adjustment mechanism can have only one actuator with differential thread and parallel thereto a sliding guide, wherein the knife strip is aligned transversely to the sliding guide and the adjustment mechanism is formed so as to slide along the sliding guide. The position setting of the knife strip then takes place via only one actuator. If the knife holder on which the knife strip is mounted is formed accordingly to be torsion-resistant and the sliding guide is executed very precisely without significant play, then one actuator is sufficient for setting the cutting gap width. However, this also means that this advantage occurs regardless of whether the actuator is formed with a differential thread with a reducing transmission ratio or is a different type of actuator, for example an actuator with a fine thread. This aspect of the invention is therefore considered to be inventive in its own right. In particular, the parallelism relative to the cutting rotor axis does not have to be set via two mutually spaced-apart actuators, but rather the parallelism to the cutting rotor can be gauged, for example, by accordingly adjusting the knife strip on the knife holder.

Nevertheless, it is advantageous to provide a locking mechanism by means of which the position of the knife strip can be fixed relative to the sliding guide, so that the torsion resistance and/or a play-free sliding guide is not of such decisive importance.

The locking mechanism can comprise a clamping sleeve to fix the knife strip. In particular, the clamping sleeve can be a slotted clamping sleeve, in which a slide pin is shiftably guided. By compressing the slotted clamping sleeve, the slide pin is fixed in the clamping sleeve and thus the knife strip is fixed relative to the clamping sleeve.

According to a second aspect, the adjustment mechanism is integrated into a control circuit, by means of which the cutting gap can be automatically gauged to a predetermined width. Such a control circuit can advantageously have a vibration sensor to record vibrations on the plastic strand granulator, as well as an evaluation device for extracting one or several parameters characteristic of the gap width from the vibrations recorded by means of the vibration sensor, wherein the control circuit furthermore comprises a control device, by means of which the adjustment mechanism is gauged in dependence on the extracted vibration parameters so that the predetermined cutting gap width is set or maintained.

For example, reference parameters obtained in field tests can be stored in a memory and compared by the evaluation device with the vibration parameters extracted from the recorded vibrations in order to produce, based on this comparison, an input value for the control device for changing the cutting gap width. The extracted vibration parameters can comprise at least one vibration amplitude and/or at least one vibration frequency.

The vibrations recorded by the vibration sensor are preferably structure-borne sound waves and/or surface waves that occur on a component of the plastic strand granulator. It is particularly preferred in this context if the structure-borne sound waves or surface waves are introduced to or into the relevant component of the plastic strand granulator by means of a transmitter provided for this purpose, and are correspondingly detected by means of a receiver spaced apart from the transmitter. More than one transmitter and/or more than one receiver can also be provided. In particular, the transmitter can be an ultrasonic transmitter, and the receiver receives the signal from the ultrasonic transmitter. Such sensors are offered by Best Sense AG, for example. Alternatively, the transmitter and receiver can be provided at the same location, wherein the receiver then detects reflected waves from the transmitter.

According to a first variant, at least one transmitter and at least one receiver are arranged in or on a bearing of the cutting rotor. According to a second variant, alternatively or additionally, at least one transmitter and at least one receiver can be arranged in or on the knife strip or a bearing of the knife strip, thus in particular in or on the knife holder. With reference to the cutting gap width, vibration parameters that are particularly meaningful could be achieved by means of an ultrasonic transmitter and a receiver spaced apart therefrom, which are arranged in a bearing of the cutting rotor.

BRIEF DESCRIPTION OF THE DRAWINGS

In the following the invention is described by way of example with reference to the accompanying figures. The figures are described as follows.

DETAILED DESCRIPTION

Figure 1:
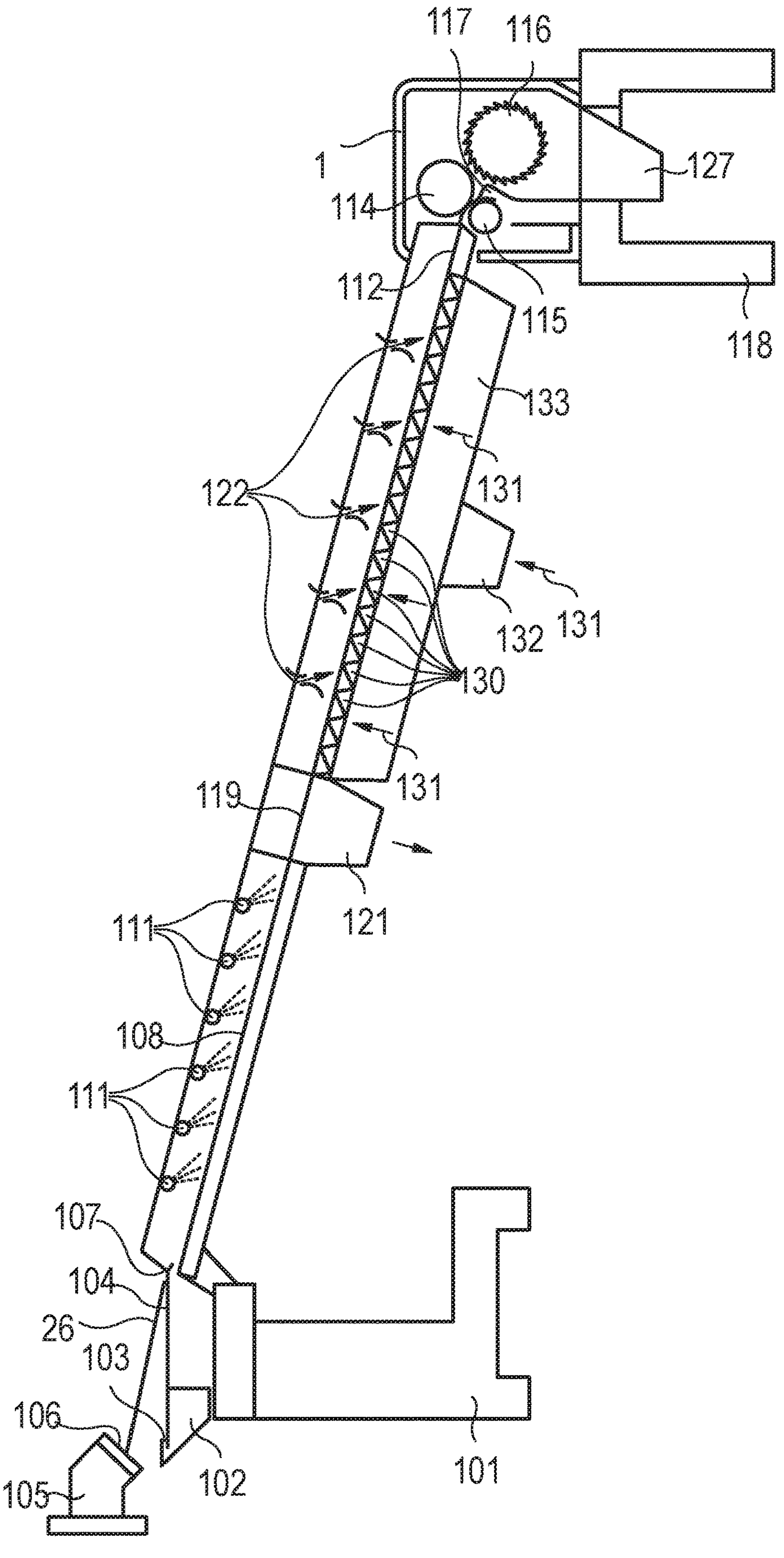
FIG. 1 a plastic strand granulating installation with a plastic strand granulator.

FIG. 1 shows a plastics strand granulating installation with reference to a concrete embodiment example. In this embodiment example, the granulating installation comprises a frame 101 on which a water tank 102 is fastened, to which water is supplied in a known manner, which serves as cooling liquid. The cooling liquid flows out of a slotted nozzle 103 onto a discharge table 104 and forms a film of water that runs off to the right. The film of water carries along plastic strands 26 of an extrudable material, here a thermoplastic plastic, which hit the discharge table 104. A nozzle pack 105 is arranged above the discharge table 104, of which a nozzle 106 is represented. Molten thermoplastic plastic is fed to the nozzle pack 105 in known manner and pressed out of the nozzle 106. Several nozzles 106 are disposed next to one another in a line. Several such lines can also form a two-dimensional nozzle arrangement. Strands 26 exiting from the nozzles 106 first fall onto the discharge table 104 and are carried along by the film of water flowing over the discharge table 104 until they reach the discharge channel 108 via the end 107 of the discharge table 104, down which channel they slide in a roughly parallel arrangement. Cooling fluid spray nozzles 111 and 122 can additionally spray cooling fluid, i.e. in particular water or possibly also air, onto the discharge channel 108 and thus increase the cooling effect exerted on the plastic strands 26. With its lower end 112, the discharge channel 108 guides the plastic strands 26 sliding down over it to the granulator housing 1, which contains two draw-in rollers 114 and 115 and a cutting rotor 116. The granulator housing 1 is mounted on a stand 118. In front of its lower end 112, the discharge channel 108 is supplied with closely adjacent inlet nozzles 130 for a fluid flow, which is indicated here by arrows 131. This fluid flow is guided through a chute 132 into a box 133 which is located below the area of the discharge channel 108 with the inlet nozzles 130. An air flow is employed here as the fluid flow, which washes around the plastic strands 26 guided over this area of the discharge channel 108 and lifts them off the bottom of the discharge channel 108 in such a manner that the plastic strands 26 are guided largely in frictionless manner. Between the area of the discharge channel 108 with the coolant spray nozzles 111 and the area with the inlet nozzles 130, a drainage section 119 is provided, below which a water outlet 121 is arranged. The drainage section 119 consists of a screen which forms the bottom of the discharge channel 108 here. The cooling water fed at the upper end of the discharge channel 108 largely flows away through this screen in the area of the drainage section 119. Numerous additional alternatives are known to the person skilled in the art for cooling the plastic strands 26 exiting from the nozzles 106 in a molten state and feeding them to the granulator housing 1 with or without cooling liquid. The granulate produced by the granulator then falls out through a discharge chute 127 for further processing.

Figure 2:
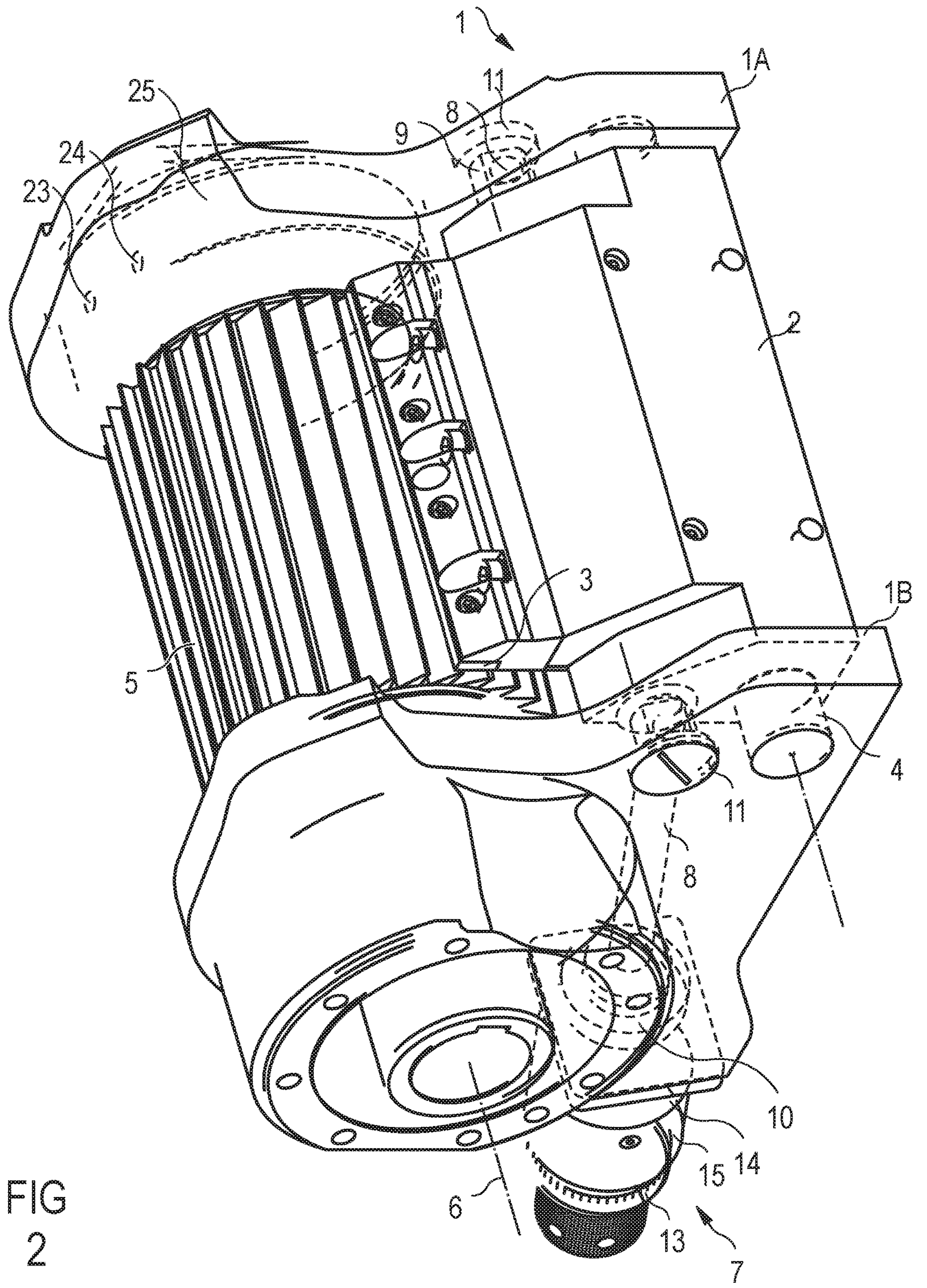
FIG. 2 a section of a plastic strand granulator.

FIG. 2 shows an independent part of a granulator housing 1 with side wall parts 1A and 1B. Between the two side wall parts 1A, 1B, a knife holder 2 with a knife strip 3 mounted thereon is pivotably mounted about a pivot axis 4 mounted in the side wall parts 1A, 1B. In addition, in the two side wall parts 1A, 1B, a cutting rotor 5 with a multiplicity of evenly mutually spaced-apart cutting knifes is rotatably mounted about a rotational axis 6. The cutting rotor 5 is disposed opposite to the knife strip 3. In the operating state with the cutting rotor 5 rotating, the plastic strands fed to the cutting rotor 5 are sheared off at the knife strip 3 by means of the cutting knifes of the cutting rotor 5. The length of the resulting granulate is determined by the feeding speed of the plastic strands, the rotational speed of the cutting rotor 5 and the distance between the cutting knifes of the cutting rotor 5. The quality of the plastic granulate depends not only on the sharpness of the cutting knifes of the cutting rotor 5 and the knife strip 3, but in particular also on the width of the cutting gap between the knife strip 3 and the cutting rotor 5.

The rotational axis 6 of the cutting rotor 5 and the pivot axis 4 of the knife holder 2 are aligned parallel to one another, and the knife strip 3 is gauged on the knife holder 2 in such a manner that it is likewise aligned parallel thereto, so that the cutting gap is constant over the entire length of the knife strip 3. In order to now set the cutting gap width between the knife strip 3 and the cutting rotor 5, according to a first embodiment example, two actuators 7 act on the pivotable knife holder 2. These are linear actuators. The actuator or actuators 7 are flanged onto the granulator housing 1 from the outside so that they can be actuated manually. For reasons of space and to implement a granulator housing that is as narrow as possible, the setting pistons 8 of the actuators 7 are accommodated in the side wall parts 1A, 1B, wherein only one of the actuators 7 is recognizable in FIG. 2. Only the distal end of the setting piston 8 can be seen of the second actuator 7. The distal ends of the setting pistons 8 are fixed in a shaft 9 rotatably mounted in the knife holder 2, while the proximal ends of the setting pistons 8 can each pivot about a fixing pin 10 oriented parallel thereto, so that no jamming of the coupled components can occur in the event of a substantially linear displacement of the setting piston 8. Rather, the setting pistons 8 can assume a jamming-free position in the course of their axial displacement. The through holes through the side wall parts 1A, 1B for guiding the shaft 9 through the granulator housing 1 and the knife holder 2 are covered with protective caps 11.

When the setting pistons 8 of the two linear actuators 7 are now moved forwards or backwards, the knife holder 2 with the knife strip 3 mounted thereon pivots about the pivot axis 4 away from the cutting rotor 5 or towards the cutting rotor 5, as a result of which the width of the cutting gap between the cutting rotor 5 and the knife strip 3 can be set accordingly. Due to a special configuration of the actuator 7, as will be explained in more detail later, this can take place manually in a simple manner without any tools, but preferably takes place automatically at least during ongoing operation via a corresponding control device that keeps the cutting gap width constant at a predetermined value.

Since it is not easy to ensure simultaneous, precise gauging of the two actuators 7, a second embodiment example provides that only one of the two actuators 7 is present, whereas the setting piston 8 on the opposite side is not part of an actuator, but is only guided in a sliding guide in parallel to the first actuator. Due to the torsion resistance of the knife holder 2 and with a correspondingly play-free mounting of the pivot axis 4 of the knife holder 2 in the granulator housing 1, the knife strip 3 can be moved relative to the rotational axis 6 of the cutting rotor 5 without the parallelism of the knife strip 3 relative to the rotational axis 6 being lost. The setting piston 8 on the side opposite the actuator 7 is only released before the displacement of the knife strip 3 and subsequently fixed again, so that the knife strip 3 is firmly clamped on both sides for ongoing operation. On the other hand, the embodiment variant with two actuators 7 is better suited for an adjustment during ongoing operation.

Figure 3:
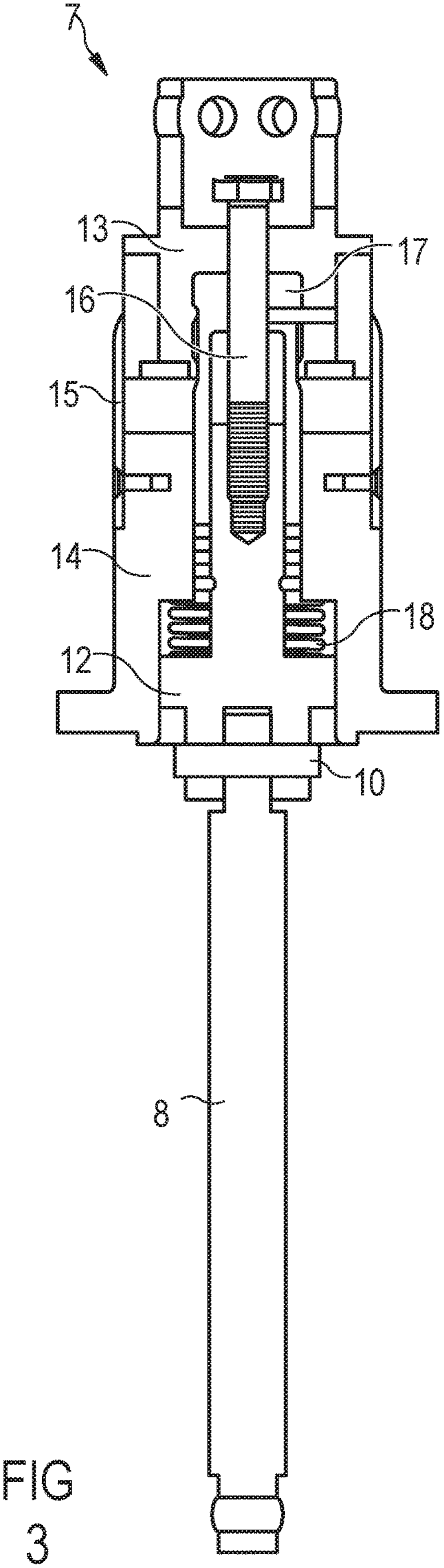
FIG. 3 an actuator with differential thread.

FIG. 3 shows a cross section through the actuator 7 with the setting piston 8 and the fixing pin 10, around which the setting piston 8 can pivot. The actuator 7 is equipped with a differential thread which has a reducing transmission ratio. The actuator 7 substantially consists of three movable components 8, 12 and 13, a stationary component 14, a dust cap 15 and a stop screw 16, wherein a construction element 17 is fixed in a rotationally fixed manner on the movable component 13. The stationary component 14 is flanged to the outside of the granulator housing 1. It has an internal thread with a first pitch, into which the movable component 13 can be screwed in and out with its construction element 17, which has an external thread with the same pitch. Accordingly, the movable member 13 can be rotated in opposite directions. In addition, the construction element 17 has an internal thread with a second pitch which differs only slightly from the first pitch of the first thread, wherein the factor is preferably between 1 and 1.5, particularly preferably about 1.2. The other movable component 12 has an external thread also with this second pitch and is screwed thereby into the construction element 17 of the movable component 13. The setting piston 8 is fixed on the movable component 12 and although it can pivot on the fixing pin 10, it cannot rotate about its longitudinal axis due to the fixation of its distal end in the shaft 9. Since the setting piston 8 cannot rotate about its longitudinal axis, the movable component 12 cannot rotate in the stationary component 14 either, but can only be displaced axially.

A rotation of the movable component 13 accordingly results in the construction element 17 moving in the stationary component 14, for example by an amount X in one direction. If the internal thread of construction element 17 and the external thread of internally disposed component 12 had the same pitch, the construction element 17 would only move forwards and backwards between the stationary component 14 and the internally disposed component 12. However, since the two pitches differ slightly from one another, for example by a factor of 1.2, the displacement of the construction element 17 by the amount X within the stationary component 14 results in the movable component 12 also being displaced axially, but only by a correspondingly lesser amount of 0.2×. In other words, the differential thread then has a reducing transmission ratio of 1:5. Preferably, the reducing transmission ratio is between 1:2 and 1:20.

According to a preferred embodiment, the pitch of the external thread of the construction element 17 is 1 mm per revolution, and the pitch of the internal thread of the construction element 17 is 1.2 mm per revolution, which, due to the effect described above, has the result that the setting piston 8 is not shifted axially by 1 mm, but by only 0.2 mm by one revolution of the movable component 13. In order to axially displace the setting piston 8 by 0.05 mm, all that is required is thus a rotation of the movable component 13 by 90°.

However, an axial displacement of the setting piston 8 by 0.05 mm does not result in the cutting gap width also changing by 0.05 mm. Rather, the extent of the displacement of the knife strip 3 depends on the point at which the setting piston 8 acts on the knife holder 2. If the point of action is roughly in the middle between the knife strip 3 and of the pivot axis 4 of the knife holder 3 and the setting piston 8 acts at this point roughly tangentially relative to the pivot axis 4, this results in a leverage effect with a transmission ratio of 2:1. In other words, a rotation of the movable component 13 by 90° does not lead to a displacement of the knife strip 3 of 0.05 mm, corresponding to the axial displacement of the setting piston 8, but to a displacement of 0.1 mm, which is still a very acceptable result for an accurately gauged positioning of the knife strip 3. The closer the shaft 9, on which the setting piston 8 acts, is to the knife strip 3, the more favorable this affects the overall transmission ratio of the adjustment mechanism.

It is of course even more favorable if the knife strip 3 is located radially between the pivot axis 4 of the knife holder 2 and the shaft 9 on which the setting piston 8 acts. In the embodiment example represented, however, this is prevented by the mounting of the cutting rotor 5 in the granulator housing 1. Alternatively, the actuator 7 can therefore, for example, be arranged with its setting piston 8 from the correspondingly opposite side in the side wall parts 1A, 1B, so that a collision with the cutting rotor mount is avoided.

On the outside of the movable component 13 a scaling is applied which translates the rotation of the component 13 into an axial displacement of the knife strip 3 relative to the cutting rotor 5. Furthermore, inside the actuator 7 several axially stacked plate springs 18 are provided which ensure that there is always axial play in the differential thread on a predetermined side.

Figure 4:
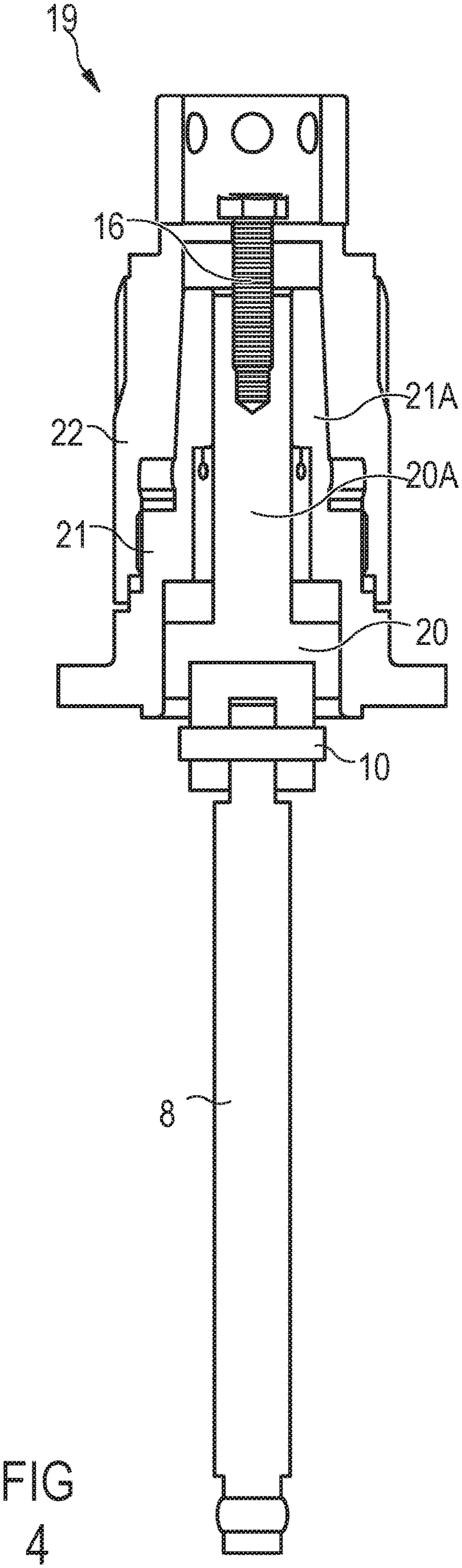
FIG. 4 a sliding guide.

As previously mentioned, instead of the second actuator 7, a sliding guide can be provided for the setting piston 8, particularly if the actuator 7 is only to be adjusted manually. The sliding guide should of course be fixable for the operating state. Such a fixable sliding guide 19 is explained in more detail below with reference to FIG. 4. The reference number 8 therein again designates the setting piston, which does not differ from the setting piston 8 of the actuator 7. The sliding guide 19 also has an internally disposed, only axially displaceable, movable component 20 with a sliding pin 20A, which is slidably guided in a stationary component 21, which has a slotted clamping sleeve 21A as an integral part. The stationary component 21 is flanged to the granulator housing 1 in the same manner as the stationary component 14 of the actuator 7. A clamping sleeve 22 can be screwed onto the stationary component 21 in such a manner that the diameter of the slotted clamping sleeve 21A of the stationary component 21 is reduced and the sliding pin 20A of the component 20 that can be shifted therein is correspondingly fixed. That is, before displacing the knife strip 3 relative to the cutting rotor 5, the clamping sleeve 22 is released from the slotted clamping sleeve 21A of the stationary component 21 and subsequently fixed again. In addition, the sliding guide 19 in turn has a fixing pin 10 and a stop screw 16 in the same manner as the actuator 7.

For the automatic adjustment of the knife strip 3 relative to the cutting rotor 5 during ongoing operation, a special control device is provided which detects and evaluates characteristic operating states of the granulator via vibration sensors and, based thereon, effects an automatic adjustment of the knife strip 3. In the concrete embodiment example according to FIG. 2, an ultrasonic transmitter 23 and a receiver 24 are integrated at a short distance from one another in a bearing shell 25 of the cutting rotor 5 and conduct structure-borne sound into the bearing shell 25 or absorb structure-borne sound. Accordingly, the transmitter 23 emits ultrasonic waves in a prescribed wave characteristic, and the receiver 24 receives these waves, which, however, are modulated in the most varied of ways due to the operating behavior of the granulator.

Figure 6:
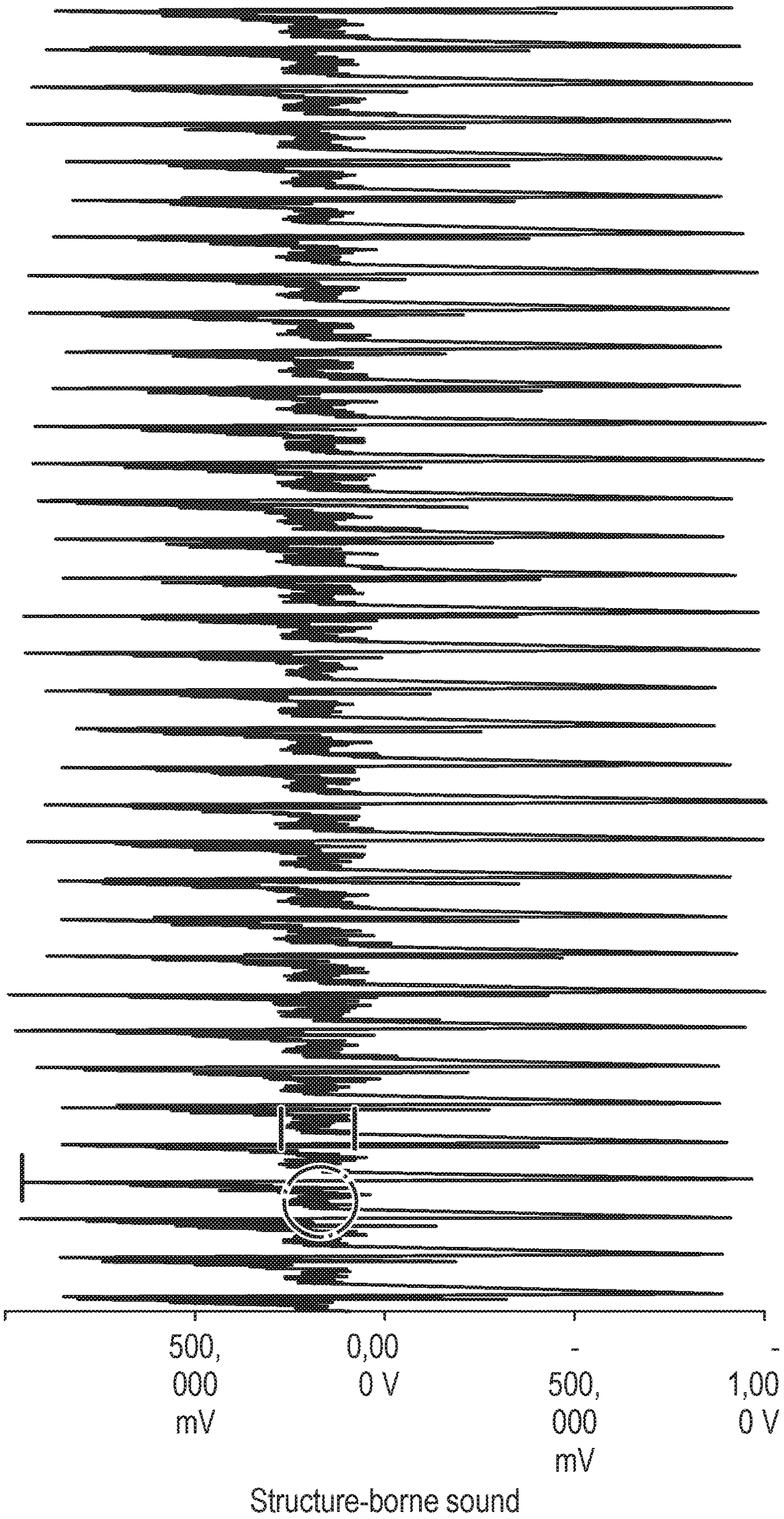
FIG. 6 ultrasonic vibrations measured on a granulator.

FIG. 6 shows an example of the structure-borne sound recorded during operation by means of such a receiver 24. This measurement signal is, on the one hand, characteristic of the specific granulator and, on the other hand, characteristic of various operating parameters. For example, the maximum amplitude of the recorded vibrations can be used to approximate the hardness of the processed plastic material. The vibration ranges with lower amplitudes between the respective maximum deflections provide information about the number of plastic strands currently being processed and thus indicate whether one or several strand breaks are to be noted. The height of the amplitude in the vibration ranges with a lower amplitude is of particular importance, since it provides information about the width of the cutting gap between the knife strip 3 and the cutting rotor 5 in particular.

By storing different reference tables for the most diverse granulator statuses (depending on the granulated material, number of granulated plastic strands, strand thickness, rotor rotational speed, cutting gap width, rotor sharpness (sharp/blunt)) conclusions can be drawn accordingly about the respective granulator status, such as the cutting gap width.

A corresponding method for operating the plastic strand granulator thus provides for the adjustment of the cutting gap width by displacing the position of the knife strip relative to the cutting rotor, wherein vibrations, for example in the bearing shell of the cutting rotor 5 or alternatively (or additionally) on the knife strip 3 or on the knife holder 2, are recorded, from which one or several vibration parameters are extracted, such as, for example, the height of the lower amplitudes according to FIG. 6, and the actuator(s) 7 for adjusting the cutting gap width are gauged accordingly. This preferably takes place by means of a control device during operation.

Figure 5:
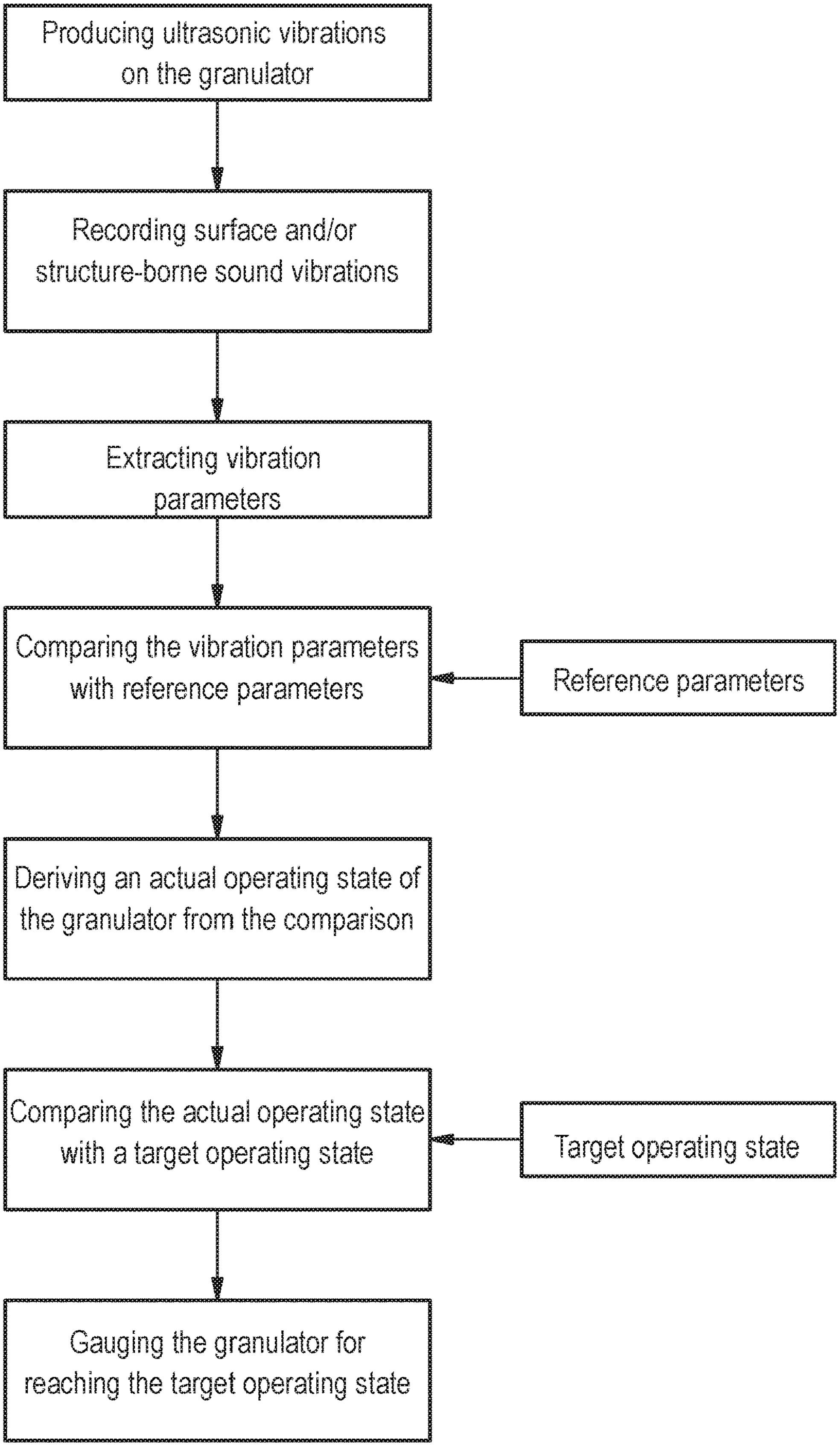
FIG. 5 a flowchart for a control circuit for gauging the granulator to a target operating state.

Specifically, the method can have the course as represented in FIG. 5. First, ultrasonic vibrations are generated on the granulator, for example by introducing structure-borne sound vibrations or surface vibrations. These are recorded and one or several vibration parameters are extracted from them. The vibration parameters extracted are compared with stored reference parameters and an actual operating state of the granulator is derived from this. The actual operating state is compared with a predetermined target operating state, and depending on the result of the comparison, the granulator is gauged in such a manner that the target operating state is achieved. This process can be repeated continuously or at predetermined time intervals, so that there is a corresponding control circuit for gauging the operating state of the granulator, in particular for gauging the cutting gap width.

The invention claimed is:

1. A plastic strand granulator for pelletizing plastic strands, comprising:
- a cutting rotor which is rotatable about a rotational axis, the cutting rotor comprising cutting knifes;
- draw-in rollers configured to feed plastic strands to the cutting rotor with a predetermined feeding speed;
- a knife strip which is arranged relative to the cutting rotor such that the knife strip and the cutting knifes of the cutting rotor together form a cutting gap for pelletizing the plastic strands fed to the plastic strand granulator, wherein:
  - a length of a resulting plastic granulate produced by the plastic strand granulator is determined by:
    - the predetermined feeding speed of the plastic strands to the cutting rotor;
    - a rotational speed of the cutting rotor; and
    - a distance between the cutting knifes of the cutting rotor; and
  - the knife strip is held in a knife holder, which is pivotably mounted about a pivot axis; and
- an adjustment mechanism for setting the cutting gap by displacing a position of the knife strip relative to the cutting rotor,
- wherein the adjustment mechanism has at least one actuator with differential thread with reducing transmission ratio, which is configured to set a pivoting position of the knife strip relative to the cutting rotor, in order to set the cutting gap; and
- wherein a distal end of the at least one actuator is fixed in a shaft which is rotatably mounted in the knife holder and a proximal end of the at least one actuator is pivotable about a fixing pin which is oriented parallel to the shaft.

2. The plastic strand granulator according to claim 1, wherein the differential thread has a reducing transmission ratio of between 1:2 and 1:20, or of about 1:5.

3. The plastic strand granulator according to claim 1, wherein a point of action of the at least one actuator on the knife holder is disposed further spaced apart from the pivot axis than the knife strip.

4. The plastic strand granulator according to claim 1, wherein a point of action of the at least one actuator on the knife holder is disposed between the pivot axis and the knife strip.

5. The plastic strand granulator according to claim 4, wherein the knife strip and the point of action of the at least one actuator on the knife holder are arranged relative to the pivot axis such that, with reference to the displacement of the knife strip relative to an adjustment of the at least one actuator, there results a leverage effect of between 1:1 and 2:1.

6. The plastic strand granulator according to claim 1, comprising a granulator housing, in which the cutting rotor is arranged, wherein the at least one actuator can be actuated from outside of the housing.

7. The plastic strand granulator according to claim 1, wherein the differential thread of the at least one actuator is executed in play-free manner by applying a suitable bias.

8. The plastic strand granulator according to claim 1, wherein the at least one actuator of the adjustment mechanism comprises two of the actuators with differential thread which are arranged parallel to each other.

9. The plastic strand granulator according to claim 1, wherein:
- the adjustment mechanism comprises a sliding guide parallel to the at least one actuator; and
- the knife strip is aligned transversely to the sliding guide and is arranged slidably along the sliding guide.

10. The plastic strand granulator according to claim 9, comprising a locking mechanism configured to fix the position of the knife strip relative to the sliding guide.

11. The plastic strand granulator according to claim 10, wherein the locking mechanism comprises a clamping sleeve configured to fix the knife strip.

12. The plastic strand granulator according to claim 11, wherein the clamping sleeve is a slotted clamping sleeve, in which a slide pin is shiftably guided.

13. The plastic strand granulator according to claim 1, wherein the adjustment mechanism is configured for manual actuation.

14. The plastic strand granulator according to claim 1, wherein the adjustment mechanism is configured for being automatically gauged to a predetermined cutting gap width by a control circuit.

15. The plastic strand granulator according to claim 14, wherein the control circuit comprises:
- a vibration sensor to record vibrations on the plastic strand granulator;
- an evaluation device to extract one or several vibration parameters from the vibrations recorded by the vibration sensor; and
- a controller configured to gauge the adjustment mechanism to the predetermined cutting gap width in dependence on the extracted vibration parameters.

16. The plastic strand granulator according to claim 15, comprising a memory, in which reference parameters are stored, wherein the evaluation device is configured to compare the extracted vibration parameters with the stored reference parameters and, based on the comparison, to produce an input value for the control device for changing the cutting gap width.

17. The plastic strand granulator according to claim 15, wherein the extracted vibration parameters comprise at least one vibration amplitude.

18. The plastic strand granulator according to claim 15, wherein the extracted vibration parameters comprise at least one vibration frequency.

19. The plastic strand granulator according to claim 15, wherein the vibrations comprise either structure-borne sound waves or surface waves or a combination of structure-borne sound waves and surface waves.

20. The plastic strand granulator according to claim 15, comprising:

at least one transmitter for introducing structure-borne sound waves or surface waves or a combination of structure-borne sound waves and surface waves; and at least one receiver spaced apart from the transmitter for receiving the structure-borne sound waves or surface waves or the combination of structure-borne sound waves and surface waves.

21. The plastic strand granulator according to claim 20, wherein the at least one transmitter is an ultrasonic transmitter.

22. The plastic strand granulator according to claim 20, wherein:

one transmitter of the at least one transmitter is in or on a bearing of the cutting rotor; and one receiver of the at least one receiver is in or on the bearing of the cutting rotor.

23. The plastic strand granulator according to claim 20, wherein:

one transmitter of the at least one transmitter is in or on the knife strip or a bearing of the knife strip; and one receiver of the at least one receiver is in or on the knife strip or the bearing of the knife strip.

* * * * *